Dec. 21, 1948.  J. E. I. CAIRNS ET AL  2,456,914
CHUCK
Filed Jan. 31, 1947

Inventor
John E. I. Cairns &
Charles D. Docherty

By
H. J. Grover
Attorney

Patented Dec. 21, 1948

2,456,914

UNITED STATES PATENT OFFICE 2,456,914

CHUCK

John Edwin Ingliston Cairns, Chalfont-St.-Peter, and Charles Dickson Docherty, Hayes, England, assignors to Electric & Musical Industries Limited, Hayes, England, a company of Great Britain Application January 31, 1947, Serial No. 725,698
In Great Britain November 23, 1944

Section 1, Public Law 690, August 8, 1946
Patent expires November 23, 1964

4 Claims. (Cl. 279—2)

This invention relates to chucks for use with glass sealing machines and other apparatus.

In the specification of Patent No. 2,219,111 a cathode ray tube is disclosed in which the cylindrical neck of the tube is provided with a plurality of protrusions spaced around said neck for the purpose of co-operating with an electron gun to maintain the latter in a predetermined position. Such protrusions have also been employed in cathode ray tubes of the velocity-modulation type for the purpose of assisting in aligning the elements of a hollow resonator as referred to in the specification of co-pending patent application Serial No. 526,183. In the manufacture of cathode ray tubes of the velocity-modulation type it is possible to employ a rotary glass sealing machine as described in the specification of British Patent No. 582,858.

The object of the present invention is to provide an improved chuck for use with glass tubing provided with circumferentially spaced protrusions whereby the glass tubing can be held by the chuck with a resilient pressure and, if necessary, rotated thereby.

According to the invention a chuck is provided comprising a support having bearing members spaced about said support and resilient means extending between said bearing members adapted to engage protrusions in glass or other tubing, said resilient means being capable of being deflected inwardly towards the centre of said support when the protrusions are engaged thereby so as to hold said tubing resiliently in position due to the engagement of said resilient means with said protrusions.

The said chuck may be employed, for example, for holding a length of glass tubing in position and for rotating the glass tubing during the sealing of a conical bulb to the end of the glass tubing in a suitable lathe or for assembling the elements of a cathode ray tube of the velocity-modulation type as described in the specification of co-pending patent application Serial No. 526,183, or may be used as the mandrels referred to in the specification of British Patent No. 582,858.

In order that the said invention may be clearly understood and readily carried into effect it will now be more fully described with reference to the accompanying drawings, in which—

Figure 1:
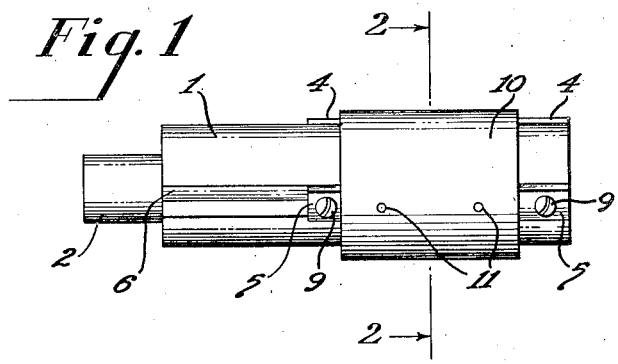
Figure 2:
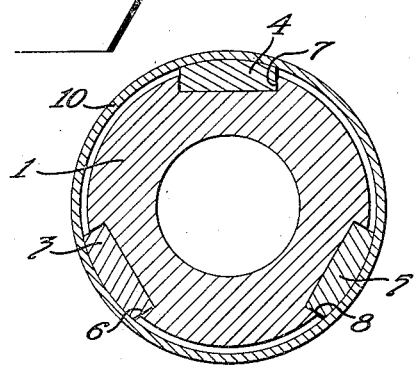
Figure 3:
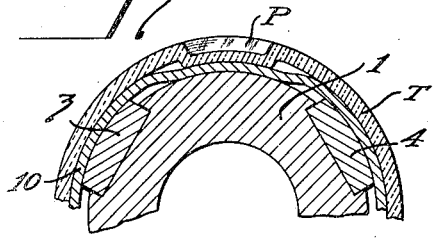
Figure 4:
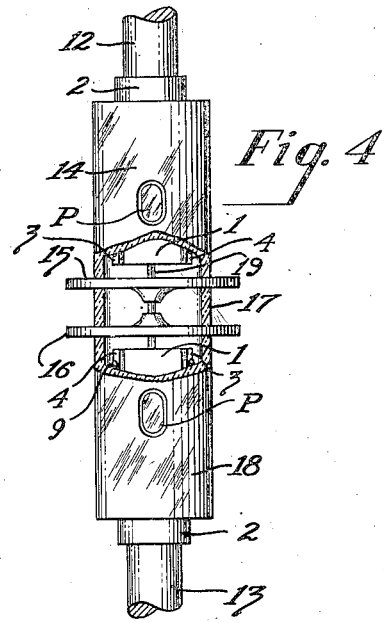

Figure 1 is an elevation of a chuck according to the preferred form of the invention, Figure 2 is a cross-sectional view taken along the line 2—2 of Figure 1, Figure 3 is a partial cross-sectional view on an enlarged scale showing a portion of glass tubing held by the chuck, and Figure 4 illustrates an arrangement of chucks suitable for use in the glass sealing machine described in the specification of British Patent No. 582,858.

As shown in Figures 1 and 2 the chuck comprises a support 1 in the form of a cylindrical member provided with a bore 2 whereby the chuck can be attached to a spindle or mandrel. The chuck shown in the drawings is designed for use with glass tubing having three protrusions equidistantly spaced about the circumference of the tube. The chuck is therefore provided with three bearing members 3, 4 and 5 equi-distantly spaced about the circumference of the support 1, the bearing members as shown in Figures 1 and 2 projecting slightly above the circumference of the support 1. The bearing members 3, 4 and 5 may be longitudinal ribs formed integrally with the support 1 but preferably the bearing members comprise longitudinal keys, as shown, which fit into longitudinal grooves 6, 7 and 8 provided in said support 1, the keys being suitably held in position by screws 9 or by other means. As aforesaid, the bearing members project beyond the circumference of the support 1 and the outer surfaces of said bearing members conform to a cylindrical surface. Resilient means extend between said bearing members and said means may comprise a plurality of leaf springs extending between said bearing members and suitably secured thereto, but preferably said means comprises a thin metal sleeve 10 formed of resilient metal and having an internal diameter corresponding to the external diameter of said bearing members. Said sleeve may be formed of Phosphor bronze and may have a thickness of approximately 0.03 of an inch and is suitably secured to said bearing members as by pins 11. Since the bearing members project beyond the circumference of said support 1 it will be appreciated that the portions of said sleeve which extend between adjacent bearing members are capable of being deflected towards said support. Thus, when a length of glass tubing T having protrusions P is applied to said chuck, the protrusions engage said resilient sleeve 10 and cause the latter to be deflected between said bearing members as shown in Figure 3 so that said sleeve serves to hold the tubing in position with a resilient pressure and with the glass tubing held via the protrusions in an accurate position with respect to a mandrel or other shaft or the like on which the chuck is mounted.

Figure 4 of the drawings illustrates a pair of chucks mounted on the spindles of the rotary glass sealing machine described in the specification of British Patent No. 582,858. One chuck is provided on the end of the upper spindle 12 and another chuck provided on the lower spindle 13, the chuck on the upper spindle serving to hold a length of glass tubing 14 in position whilst being sealed to a pair of copper discs 15 and 16 between which is disposed an intermediate length of glass tubing 17, whilst the chuck on the spindle 13 serves to hold a further length of glass tubing 18 in position, the three lengths of tubing during operation of the machine being sealed to the copper discs 15 and 16. The two chucks may be aligned relatively to one another by the provision of a pin 19 attached to the end of one chuck and entering an axial aperture in the end of the other chuck.

The chuck, according to the invention, can be employed not only for the above-mentioned purpose but also for any other purpose where it is required to hold lengths of glass or other tubing provided with protrusions whilst performing sealing or other operations.

What we claim is:

1. A chuck comprising a support having bearing members spaced about said support and resilient means extending between said bearing members adapted to engage protrusions in glass or other tubing, said resilient means being capable of being deflected inwardly towards the centre of said support when the protrusions are engaged thereby so as to hold said tubing resiliently in position due to the engagement of said resilient means with said protrusions.

2. A chuck according to claim 1, wherein said resilient means comprises a thin resilient sleve surrounding said bearing members.

3. A glass sealing machine including chucks for holding cylindrical glass parts in position for sealing said parts, each of said chucks comprising a cylindrical member having a bore, longitudinal raised portions on the outer surface of said cylindrical member, a resilient sleeve around a peripheral portion of the outer surface of said member and engaging said raised portions, said sleeve being deflectible between said raised portions to engage a portion of the outer surface of said cylindrical member, and a mandrel engaging the bore in each of said cylindrical members for aligning said chucks, whereby said glass parts are aligned for sealing.

4. A chuck for resiliently engaging protrusions on the inside surface of a cylindrical glass part, comprising a cylindrical member, bearing members longitudinally disposed and peripherally spaced on said member, and projecting outwardly therefrom, a resilient band surrounding a periphery of said member and engaging said bearing members, said resilient band being responsive to said protrusions to engage a peripheral portion of said member intermediate said bearing members, whereby said chuck holds said glass part against rotation.

JOHN EDWIN INGLISTON CAIRNS.
CHARLES DICKSON DOCHERTY.

REFERENCES CITED

The following references are of record in the file of this patent:

UNITED STATES PATENTS

| Number | Name | Date |
| --- | --- | --- |
| 1,316,638 | Palmgren | Sept. 23, 1919 |
| 2,264,589 | Rydquist | Dec. 2, 1941 |